(12) United States Patent
Majerowicz

(10) Patent No.: US 10,761,861 B1
(45) Date of Patent: Sep. 1, 2020

(54) SYSTEM, METHOD, AND COMPUTER PROGRAM FOR EVENT STREAM MODIFICATION

(71) Applicant: Amdocs Development Limited, Limassol (CY)

(72) Inventor: Lucas Dario Majerowicz, Herzlyia (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 203 days.

(21) Appl. No.: 15/630,815

(22) Filed: Jun. 22, 2017

(51) Int. Cl.
| | |
|---|---|
| H04L 5/14 | (2006.01) |
| G06F 9/448 | (2018.01) |
| G06F 9/54 | (2006.01) |
| G06Q 30/06 | (2012.01) |
| G06F 16/2455 | (2019.01) |

(52) U.S. Cl.
CPC ............ *G06F 9/4488* (2018.02); *G06F 9/542* (2013.01); *G06F 16/24568* (2019.01); *G06Q 30/0633* (2013.01)

(58) Field of Classification Search
CPC .. G06F 9/4488; G06F 16/24568; G06F 9/542; G06Q 30/0633
See application file for complete search history.

(56) References Cited

U.S. PATENT DOCUMENTS

| | | | | |
|---|---|---|---|---|
| 8,745,057 B1* | 6/2014 | Li | ...................... | G06Q 10/109 707/737 |
| 2015/0278060 A1* | 10/2015 | He | ...................... | G06F 11/263 714/37 |
| 2016/0048780 A1* | 2/2016 | Sethumadhavan | .... | G06Q 50/24 705/2 |
| 2016/0239660 A1* | 8/2016 | Azvine | .................. | G06Q 10/04 |
| 2017/0104799 A1* | 4/2017 | Prock | .................... | H04W 12/06 |
| 2018/0005186 A1* | 1/2018 | Hunn | .................... | G06F 17/211 |

* cited by examiner

*Primary Examiner* — Doon Y Chow
*Assistant Examiner* — Abdou K Seye
(74) *Attorney, Agent, or Firm* — Zilka-Kotab, P.C.

(57) ABSTRACT

A system, method, and computer program product are provided for event stream modification. In operation, a system identifies an event to add to an event stream. Moreover, the system appends the new event to at least one of any event in the event stream based on criteria.

20 Claims, 7 Drawing Sheets

502

Name
[Enter name]

Category
[ ▼ ]

Price
[Enter price]

Visible
[yes ▼]

Color
[Enter color]

[Submit]

[Close]

500

504

Add Category ×

Name
[Enter name]

[Submit]

[Close]

506

Add Branch ×

Name
[Enter name]

[Submit]

[Close]

FIGURE 5

SYSTEM, METHOD, AND COMPUTER PROGRAM FOR EVENT STREAM MODIFICATION

FIELD OF THE INVENTION

The present invention relates to event stream modification, and more particularly to appending a new event to any event in an event stream based on criteria.

BACKGROUND

Event Sourcing is a technique used to ensure every change to the state of an application is captured in an event object. These event objects are stored in a sequence as the application state. Event sourcing may be used for most implementations that require a state to be maintained across a sequence of events (e.g. logging shipping information, etc.). Currently, event processing techniques are limited to the serial storing of events.

There is thus a need for addressing these and/or other issues associated with the prior art.

SUMMARY

A system, method, and computer program product are provided for event stream modification. In operation, a system identifies an event to add to an event stream. Moreover, the system appends the new event to at least one of any event in the event stream based on criteria.

BRIEF DESCRIPTION OF THE DRAWINGS

FIG. 5 shows user interfaces for event stream modification, in accordance with one embodiment.

DETAILED DESCRIPTION

Figure 1:
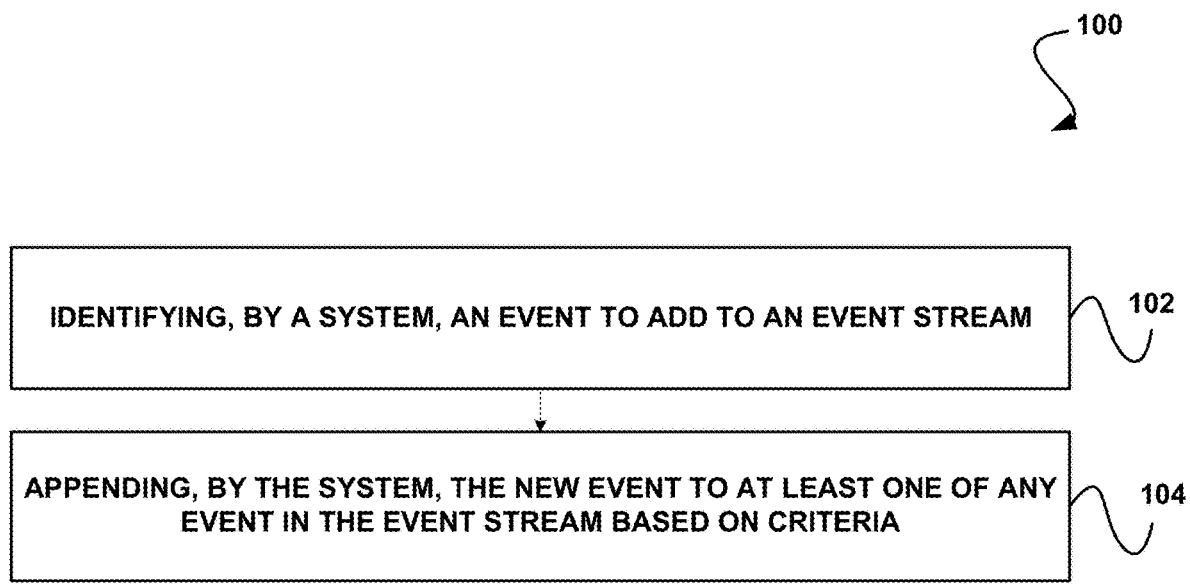
FIG. 1 illustrates a method for event stream modification, in accordance with one embodiment.

FIG. 1 illustrates a method 100 for event stream modification, in accordance with one embodiment.

In operation, a system identifies an event to add to an event stream. See operation 102. The event stream may be associated with any series of events. For example, the event stream may be associated with a product and/or service ordering process. In this case, in one embodiment, the product ordering process may be associated with a telecommunication product ordering process. In one embodiment, each event in the event stream may be serialized as a JavaScript Object Notation (JSON) object and stored as a node.

The system appends the new event to at least one of any event in the event stream based on criteria. See operation 104. The criteria may be associated with user input and/or logic based rule(s). For example, a user may indicate where the event should be added in the event stream. As another example, a rule may determine where the event should be added in the event stream.

The new event may be appended to an event in the event stream that is not a final event in the event stream. In other words, the event may be added as a branch in the event stream, as opposed to serially in the event stream. In one embodiment, the new event may be added as a JSON object and stored as a node in the event stream.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
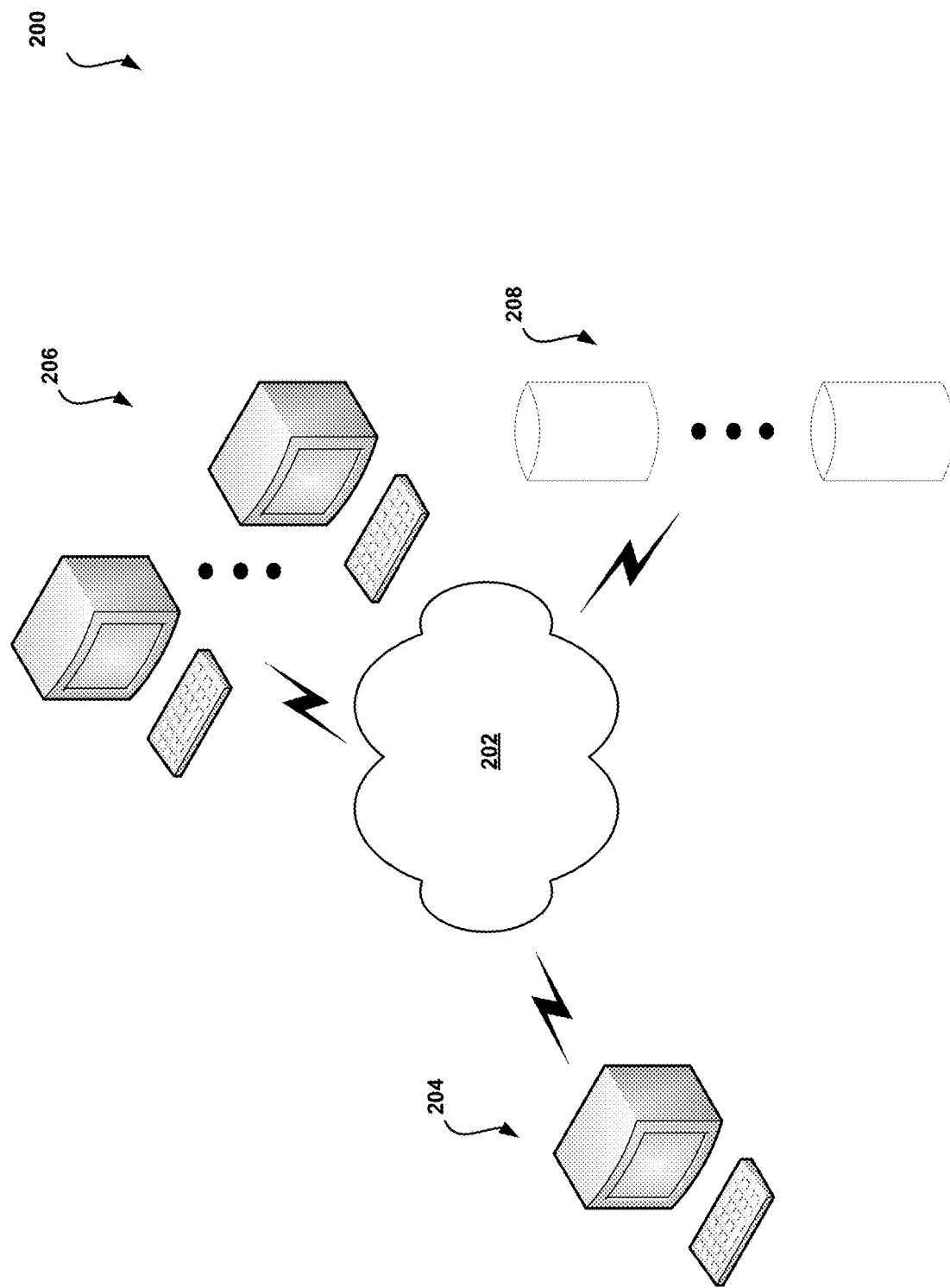
FIG. 2 shows a system for event stream modification, in accordance with one embodiment.

FIG. 2 shows a system 200 for event stream modification, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an event stream modification system 204, which may implement a variety of applications or software, etc. The event stream modification system 204 may be capable of communicating with a plurality of systems 206, either directly or over one or more networks 202, for modifying event streams. The event stream modification system 204 may also be in communication with one or more repositories/databases 208.

In operation, the event stream modification system 204 may be utilized to add git-like functionality to any application using event sourcing. In one embodiment, the event stream modification system 204 may be utilized for managing products using event sourcing, node.js, and neo4j. Event sourcing will enable the event stream modification system 204 to support git-like features such as versioning, branching, and merging that would be very hard to support with a more traditional approach. In one embodiment, the event stream modification system 204 may utilize a scalable graph database tool, such as neo4j, for storing data because the graph fits with the application and allows a user to perform queries more efficiently than using other types of databases.

In one embodiment, the event stream modification system 204 may be utilized to create a web service for managing products for an ecommerce website. The event stream modification system 204 may be utilized to create and manage categories and products. Instead of limiting event stream modification to event addition at the end of a serial event stream, the event stream modification system 204 allows for addition of a new event at any location in the event stream (e.g. as a new branch, etc.).

Figure 3:
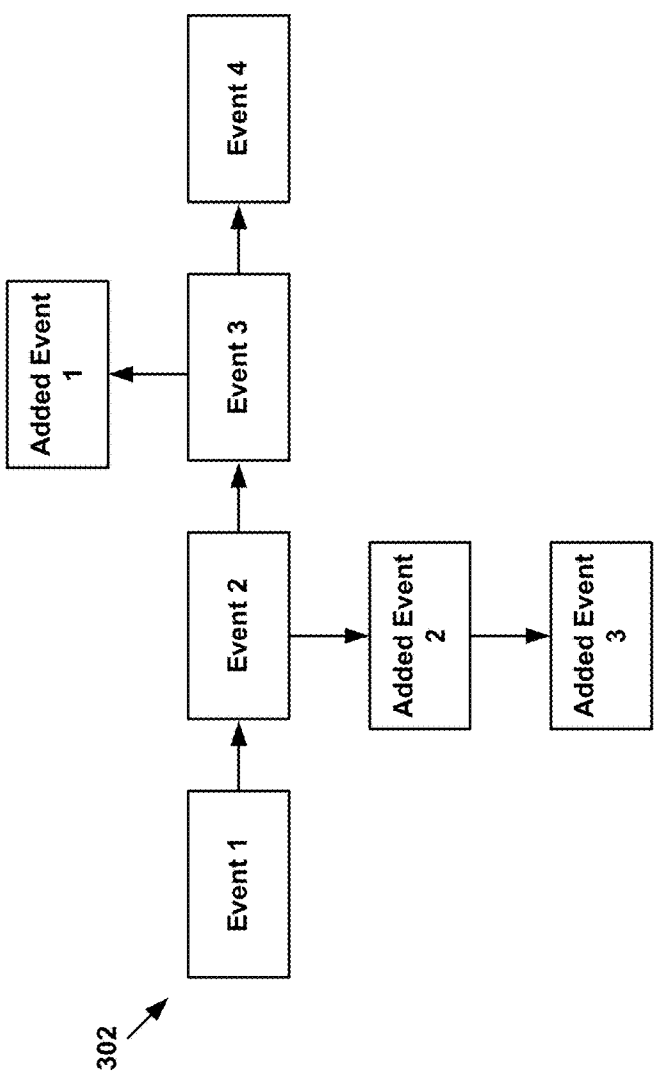
FIG. 3 shows an event stream example, in accordance with one embodiment.

FIG. 3 shows an event stream example 300, in accordance with one embodiment. As an option, the event stream example 300 may be implemented in the context of the details of the previous figures and/or any subsequent figure(s). Of course, however, the event stream example 300 may be implemented in the context of any desired environment. Further, the aforementioned definitions may equally apply to the description below.

As shown, new events may be added to an event stream 302 at any location in an event stream based on logical rules and/or based on user input.

Figure 4:
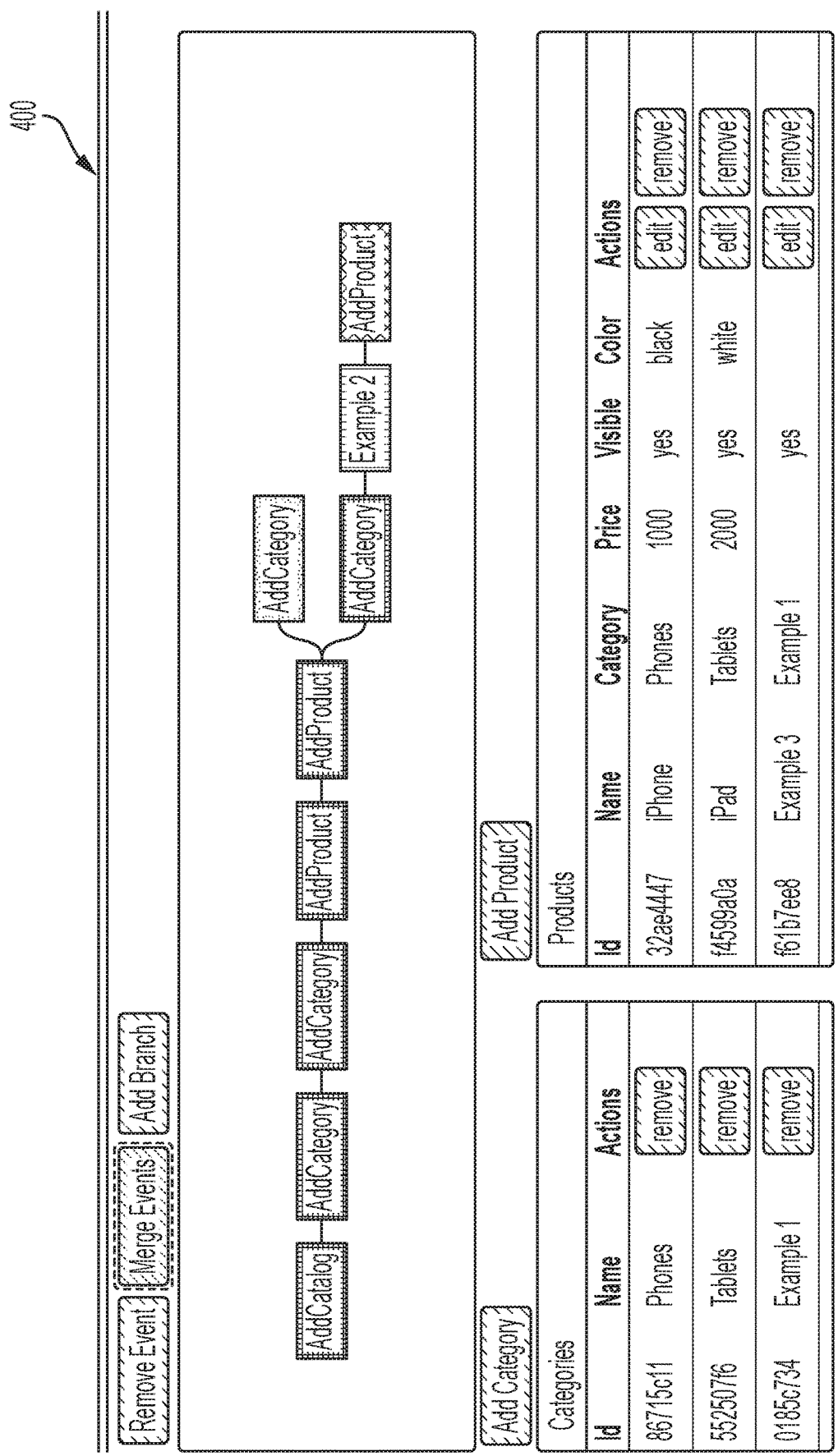
FIG. 4 shows a user interface for event stream modification, in accordance with one embodiment.

FIG. 4 shows a user interface 400 for event stream modification, in accordance with one embodiment. As an option, the user interface 400 may be implemented in the context of the details of the previous figures and/or any subsequent figure(s). Of course, however, the user interface 400 may be implemented in the context of any desired environment. Further, the aforementioned definitions may equally apply to the description below.

The user interface 400 may be utilized to modify event streams. In this example, the event stream is associated with ecommerce, however, any type of event stream may be modified.

FIG. 5 shows user interfaces 500 for event stream modification, in accordance with one embodiment. As an option, the user interfaces 500 may be implemented in the context of the details of the previous figures and/or any subsequent figure(s). Of course, however, the user interfaces 500 may be implemented in the context of any desired environment. Further, the aforementioned definitions may equally apply to the description below.

As an example, the user interface 502 may be used to add a new product to the event stream displayed in FIG. 4. The user interface 504 may be used to add a new category to the event stream displayed in FIG. 4. Additionally, the user interface 506 may be used to add a new branch to the event stream displayed in FIG. 4.

In short, the idea of event sourcing is to represent changes to application states as events. These events are immutable and are normally stored sequentially in some sort of event store for the entire life of the application. For example, if a user wanted to delete a product, the user would append a Delete Product event, containing the ID of the product to be deleted. In order to access the actual state of the application the user normally needs to build it by running through all the events in sequential order and applying them. In functional terms, this would be a left fold of all events. For example, an event store may resemble what is shown as the main event stream 302 in FIG. 3, without the added events in the branches.

As one example of an implementation of the event stream modification system described herein, for descriptive purposes, there may be a case with five main event types: 'Add Category', 'Add Product', 'Remove Category', 'Remove Product' and 'Edit Product Attribute'. Each event type is represented as a class. Table 1 shows one example of code for the Add Category event, which may be implemented by the event stream modification system.

TABLE 1

```
const Category = require('../models/Category');
class AddCategoryEvent {
  constructor(inventory, categoryId, categoryName) {
    this.inventory = inventory;
    this.categoryId = categoryId;
    this.categoryName = categoryName;
    this.name = 'AddCategoryEvent';
    this.parent = null;
  }
  process( ) {
    this.inventory.addCategory(new Category(this.categoryId,
```

TABLE 1-continued

```
      this.categoryName));
  }
}
module.exports = AddCategoryEvent;
```

Each event class has a process that is called when the list of events is played in order to re-build the actual state of the application. In this example, each event is serialized as JSON and stored as a node on neo4j. New nodes are connected to their parent node by a directed edge.

Storing the events in this manner, sequentially, one after the other, makes the retrieval process extremely simple and efficient.

A web server exposes an API endpoint that allows clients to insert new events and, optionally, attach them to an existing node. Table 2 shows an example of the payload.

TABLE 2

```
{
  "events":[
    {
      "name":"AddCategoryEvent",
      "categoryName":"Phones",
      "categoryId":"1234"
    }
  ],
  "parentId":1
}
```

With respect to versioning, since the event stream modification system is storing all historical changes as individual events, the event stream modification system can very easily show what the data looked like at any point in time. Instead of replaying all events up to the last event, the event stream modification system can replay them up to any specific, arbitrary, point.

This ability to see what the state of the application was at any point in time is a very good use case for event sourcing. The event stream modification system may also implement features such as unlimited undo/redo.

In order to support this functionality, the web service utilized by the event stream modification system has an endpoint that receives an event ID and returns the resulting state obtained from replaying all the corresponding events up to the input event.

With respect to branching, the event stream modification system may append events to any event in the chain. Thus, the event stream modification system allows an implementation to have different versions of the application state co-existing at the same time. This would be useful if different users want to work on their own version of the data, or if they want to add events without affecting the latest stable version. Once an implementation starts branching out, the chain of events becomes a tree of events, which is useful to model and query in a graph database such as neo4j.

Given that an implementation may have multiple branches, the event stream modification system may function to merge branches, similar to what git does.

In this case, the event stream modification system (or a user) needs to choose two events (or branches), the source and the target. The event stream modification system finds all the events that the source has but the target does not, optionally process them, and then append them to the target event.

With respect to finding the events, the event stream modification system finds all the events (or changes) that precede the source event and that are missing in the target event. All the events in all branches form a tree. First, the event stream modification system needs to find the Lowest Common Ancestor (LCA) between the source and target events. Then the events that the event stream modification system is looking for are all the events between the LCA event (excluding) and the source event (including).

Fortunately, Cypher, neo4j's query language, is expressive enough that the event stream modification system can perform this in one query, as shown in Table 3.

TABLE 3

```
...
    static getEventsforMerge(eventId, eventFromId) {
        const command = 'MATCH (e1:Event)<-[:APPEND*0..]-
(x:Event)-[:APPEND*0..]->(e2:Event)
        MATCH (x)-[:APPEND*0..]->(e:Event)-[:APPEND*0..]->(e2)
        where ID(e1) =${eventId}
            and ID(e2) =${eventFromId}and ID(e) < > ID(x)
            return e';
        return new Promise((resolve, reject) => {
            session.run(command).then(result => {
                const events = result.records.map((record) => record.get(0).
properties);
                resolve(events);
            });
        });
    }
...
```

The query shown in Table 3 finds the LCA event and returns the corresponding list of events that the event stream modification system needs.

Once the event stream modification system has the events, the event stream modification system needs to append them to the target event. For this example, the event stream modification system is just appending the events. However, for most applications, before the events are added, the event stream modification system may perform a check for conflicts (similar to what git does) or inconsistencies. Such conflict checks may include, for example, determining what happens if the merge tries to edit a deleted product (in the target branch), determining whether the merge tries to modify a value that has been modified in the target branch, determining which value is the right value, and/or determining what type of conflicts might exist and how to solve them (depends on the application). In some cases, the event stream modification system will be able to solve the conflicts automatically.

Table 4 shows the source code for one technique that performs a merge. By implementing this code, the event stream modification system finds the relevant events and appends them to the target event.

TABLE 4

```
..
    static mergeEvents(eventId, eventFromId, callback) {
        return new Promise((resolve, reject) => {
            EventRepository.getEventsforMerge(eventId,
eventFromId).then((events) => {
                Controller.insertEvents(events, eventId, resolve);
            });
        });
    }
...
```

This pattern of branching and merging is a very good fit for mobile applications that need to work online as well as offline, and especially for applications that allow collaboration between users. Every time a user changes data in the application, the corresponding events may be processed locally and also stored in an internal buffer or queue of events. Whenever the application is online, the events may be synced with the server. If the application happens to be offline, the events in the buffer may stay there until the application goes back online and they can be synced with the server. The server, which might get requests from multiple clients working on the same data, may handle the merging logic.

In one embodiment, the event stream modification system may use memoization in order to avoid replaying all past events every time it needs to rebuild the current state of the system. Memoization refers to an optimization technique used primarily to speed up computer programs by storing the results of expensive function calls and returning the cached result when the same inputs occur again.

In one embodiment, the event stream modification system can have checkpoints between X number of events (where X is a positive integer), where each checkpoint contains a memoization of the application state up to the previous events. The event stream modification system may also keep an up-to-date cache of the application state in memory. Every time there is a new event, the event stream modification system may append it to the events store and also apply it to the copy in memory.

Figure 6:
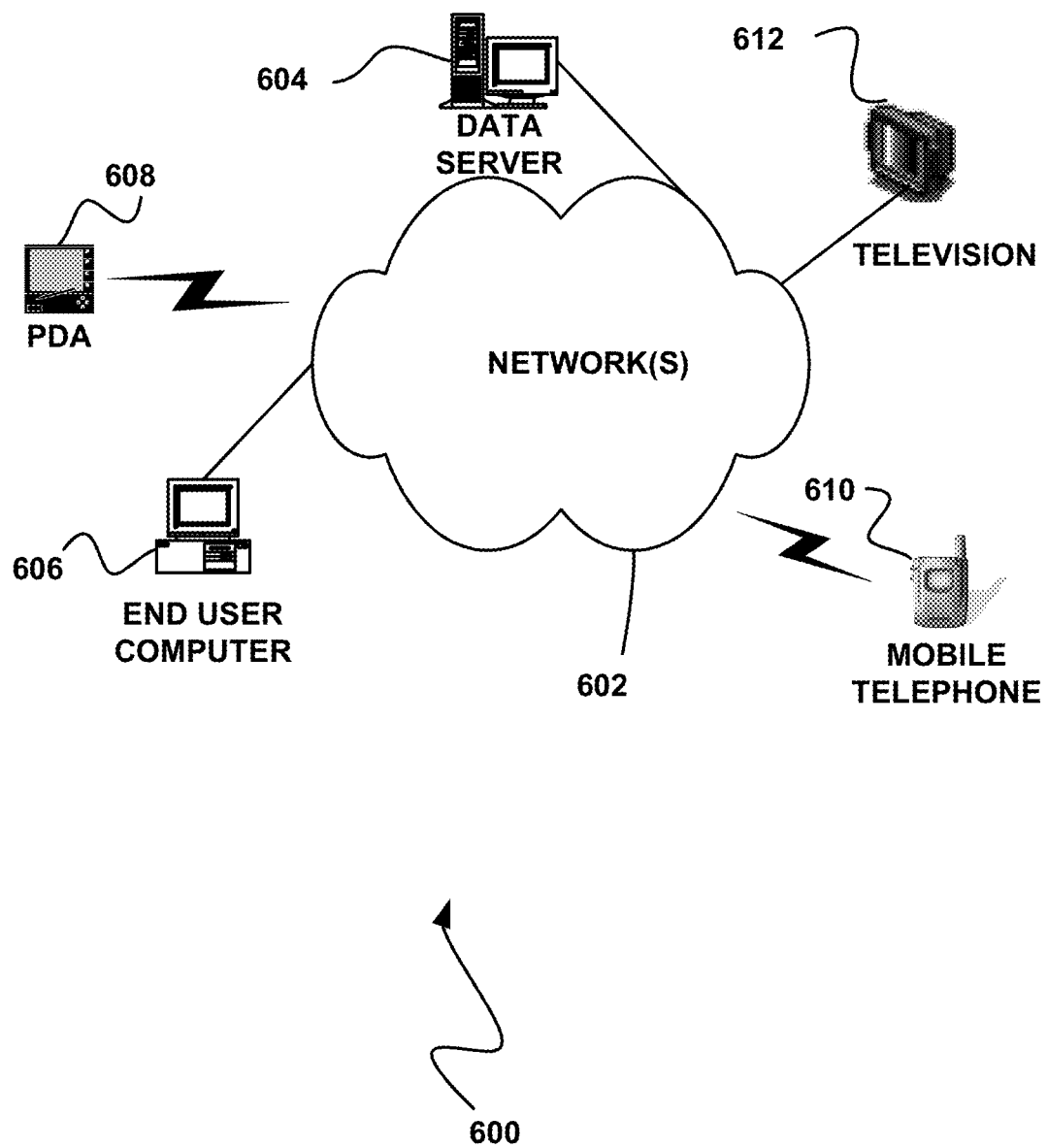
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
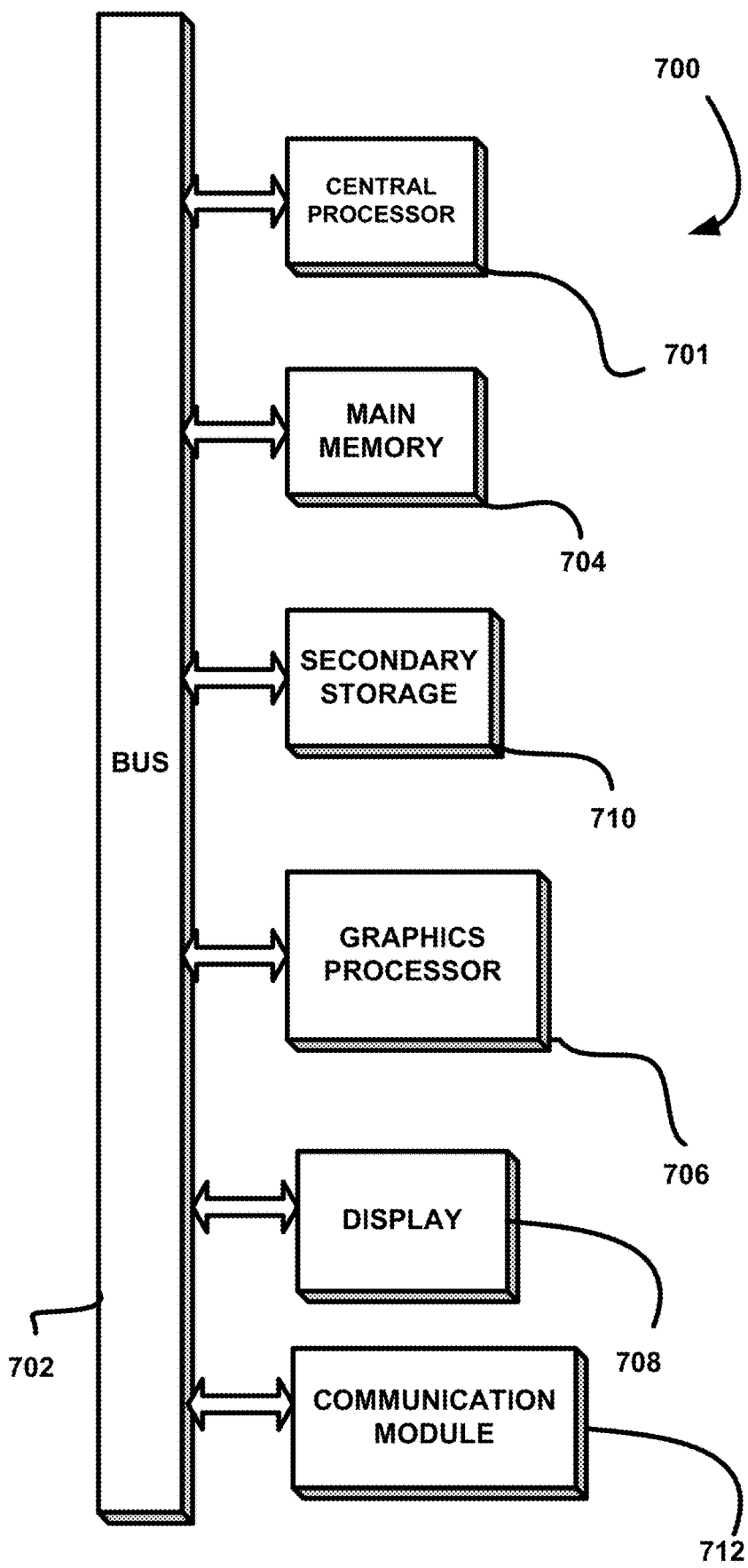
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
storing, by a system, an event stream storing historical changes made to an application as individual events, wherein different versions of the application co-exist in the event stream at the same time;
identifying, by the system, a new event to add to the event stream for one of the versions of the application that is not a latest stable version of the application; and
appending, by the system, the new event to an existing event in the event stream that is associated with the one of the versions of the application, based on criteria, wherein the existing event in the event stream to which the new event is appended is not a final event in the event stream.

2. The method of claim 1, wherein the criteria includes user input.

3. The method of claim 1, wherein the criteria includes a logic based rule.

4. The method of claim 1, wherein each event in the event stream is serialized as a JavaScript Object Notation (JSON) object and stored as a node.

5. The method of claim 1, wherein the event stream is associated with a product ordering process.

6. The method of claim 5, wherein the product ordering process is associated with a telecommunication product ordering process.

7. The method of claim 1, wherein the new event is appended as a branch in the event stream, such that the event stream with the new event appended is a tree of events.

8. The method of claim 1, further comprising replaying at least a subset of events in the event stream with the new event appended, up to a specific point that is not the final event in the event stream.

9. The method of claim 1, further comprising merging a source branch and a target branch included in the event stream by:
finding a set of events that are included in the source branch but not included in the target branch,
performing a conflict check between the set of events and the target branch, and
appending the set of events to the target branch.

10. A computer program product embodied on a non-transitory computer readable medium, comprising computer code for:
storing, by a system, an event stream storing historical changes made to an application as individual events, wherein different versions of the application co-exist in the event stream at the same time;
identifying, by the system, a new event to add to the event stream for one of the versions of the application that is not a latest stable version of the application; and
appending, by the system, the new event to an existing event in the event stream that is associated with the one of the versions of the application, based on criteria, wherein the existing event in the event stream to which the new event is appended is not a final event in the event stream.

11. The computer program product of claim 10, wherein the criteria includes user input.

12. The computer program product of claim 10, wherein the criteria includes a logic based rule.

13. The computer program product of claim 10, wherein each event in the event stream is serialized as a JavaScript Object Notation (JSON) object and stored as a node.

14. The computer program product of claim 10, wherein the event stream is associated with a product ordering process.

15. The computer program product of claim 14, wherein the product ordering process is associated with a telecommunication product ordering process.

16. A system, comprising one or more processors, operable for:
storing, by the system, an event stream storing historical changes made to an application as individual events, wherein different versions of the application co-exist in the event stream at the same time;
identifying, by the system, a new event to add to the event stream for one of the versions of the application that is not a latest stable version of the application; and
appending, by the system, the new event to an existing event in the event stream that is associated with the one of the versions of the application, based on criteria, wherein the existing event in the event stream to which the new event is appended is not a final event in the event stream.

17. The system of claim 16, wherein the criteria includes user input.

18. The system of claim 16, wherein the criteria includes a logic based rule.

19. The system of claim 16, wherein each event in the event stream is serialized as a JavaScript Object Notation (JSON) object and stored as a node.

20. The system of claim 16, wherein the event stream is associated with a product ordering process.

* * * * *